Dec. 28, 1965     D. T. GREENE, JR     3,225,592

ENGINE TORQUE MEASURING APPARATUS

Filed Sept. 3, 1963     4 Sheets-Sheet 1

INVENTOR.
DEWITT T. GREENE, JR.

BY
ATTORNEY

INVENTOR.
*DEWITT T. GREENE, JR.*
BY
ATTORNEY

Dec. 28, 1965   D. T. GREENE, JR   3,225,592
ENGINE TORQUE MEASURING APPARATUS
Filed Sept. 3, 1963   4 Sheets-Sheet 3

INVENTOR.
DEWITT T. GREENE, JR.
BY
ATTORNEY

United States Patent Office 3,225,592
Patented Dec. 28, 1965

3,225,592
ENGINE TORQUE MEASURING APPARATUS
Dewitt T. Greene, Jr., 3519 Falls Drive, Dallas, Tex.
Filed Sept. 3, 1963, Ser. No. 306,165
4 Claims. (Cl. 73—136)

The present invention generally relates to apparatus for measuring the torque delivered by an engine. More specifically, it relates to apparatus responsive to torque delivered by an aircraft engine for use with a system for automatically feathering the propeller thereof when engine failure is experienced during takeoff. The apparatus also has application to a system for indicating engine performance characteristics which are proportional to torque delivered.

Most multi-engine aircraft are equipped with an automatic propeller feathering system for feathering the propeller of an engine during take-off of the aircraft should that engine fail. Feathering is possible on variable pitch propellers, with which all multi-engine aircraft are equipped, and comprises changing the pitch of the propeller from the angle of maximum air flow during take-off to where the broad surface of the propeller is parallel to the direction of motion of the aircraft. This greatly reduces the drag on the aircraft when an engine fails and results in a maximum lift by the engines operating at full power. At least one problem encountered in conventional automatic feathering systems is the ability to measure instantaneously an engine failure, in addition to avoiding erroneous indications of engine failure. Should an erroneous indication of failure be given and the propeller feathered, a loss of an operating engine will result. Neither can conventional systems detect all types of engine failure, such as a manifold pressure decrease, loss of r.p.m., etc.

The present invention has an object the provision of apparatus for measuring the torque delivered by an engine for the primary application to a system for automatically feathering the propeller of an aircraft engine upon failure thereof during take-off of the aircraft. The torque measuring apparatus also has utility for providing the pilot of the aircraft with measurements of engine performance characteristics that are a function of the delivered torque, such as, for example, the delivered horsepower, pressure and the like. The invention comprises a torque bar mounted securely at one end to the engine with its axis aligned along the axis of rotation of the crankshaft, and the other end of the torque bar is mounted to a support stationary relative to the engine. The torque bar twists as the engine rotates on its mounts according to the delivered torque, and means are mounted to the torque bar to measure the torque. It has been found that an immediate loss of torque is incident to all types of engine failure, thus yielding an instantaneous indication of same with the apparatus of the invention.

Other objects, features and advantages of the present invention will be apparent from the following description thereof when taken in conjunction with the appended claims and attached drawing wherein like reference numerals refer to like parts throughout the several figures, and in which:

FIGURE 3a is a side elevational view of one embodiment of the torque measuring apparatus of the invention;

FIGURE 3b is a sectional view taken across lines b—b of FIGURE 3a;

FIGURE 3c is a view of the apparatus of FIGURE 3a when revolved 180°;

Figure 1:
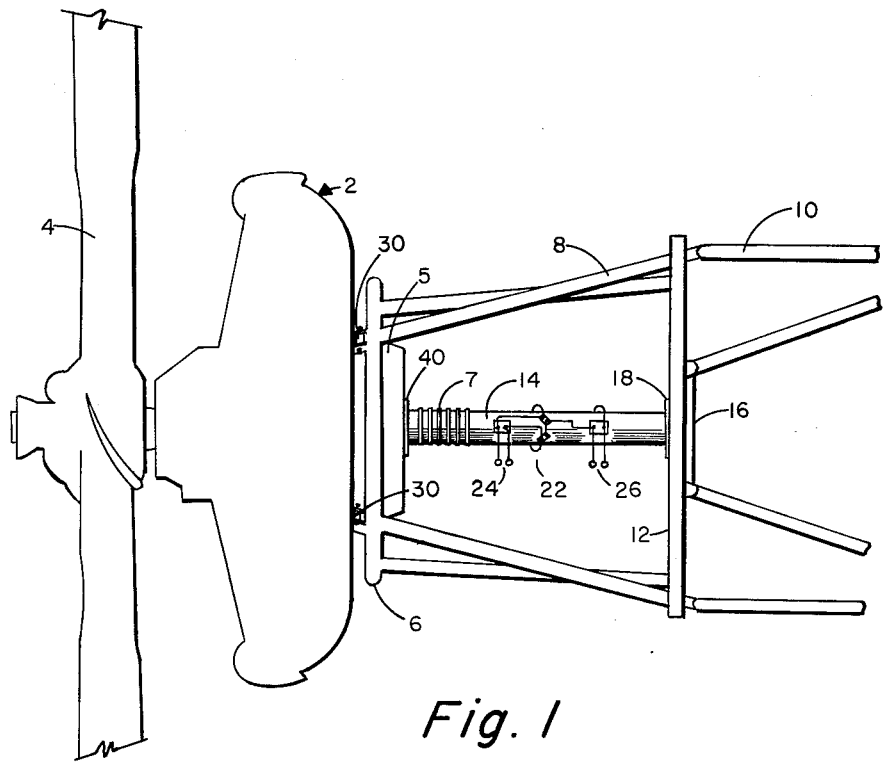
FIGURE 1 is a side elevational view of an aircraft engine of the radial type secured to a framework mounting, with the torque responsive apparatus of the invention mounted to the engine.

Referring now to FIGURE 1 of the drawing, there is shown a side elevational view of an airplane engine 2 mounted on tubular framework within the wing of the airplane with a propeller 4 mounted on the central shaft of the engine. The engine is of the radial type, although the torque measuring apparatus of the invention can be used in conjunction with other types of engines such as, for example, in-line, horizontal opposing, and the like. The engine is mounted on a circular framework 6 by means of flexible mounting brackets and vibration isolators 30 and bolts 34, as more clearly shown in FIGURE 2. The circular framework 6 is supported by a tubular framework mounting 8, which in turn is supported by another tubular framework 10, the latter being securely affixed to one or more main beams within the wing of the aircraft. A firewall 12 comprised of a thin metal sheet, separates the compartment occupied by the framework 8, called zone 2, from the compartment occupied by the framework 10, called zone 3.

The torque measuring apparatus 14 is mounted at one end against the rear portion 5 of the engine at location 20, and against the fire wall at location 18 on the other end. Because of the normally slight structural strength of the firewall, an additional plate 16 supported by the framework 10 is used to maintain the torque bar stationary on this end. This end of the torque bar can be mounted on any other suitable support in the engine housing, if so desired. As will be explained below in more detail, the torque measuring apparatus comprises a torsion bar mounted along the crank shaft axis of rotation of the aircraft engine. The torque bar is rigidly mounted between the aircraft engine and the stationary support by any suitable means, such as bolts or the like.

Figure 2:
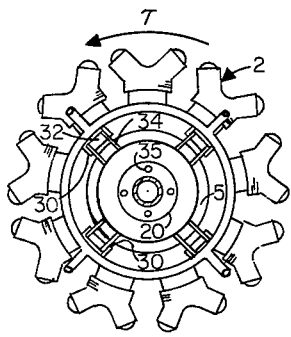
FIGURE 2 is a rear view of the engine illustrating the engine mounts.

Referring to FIGURE 2 in conjunction with FIGURE 1, it can be seen that during operation of the engine, with the crank shaft turning in a clockwise direction viewed from the rear of the engine as shown in FIGURE 2, the engine will have a tendency to rotate on the engine mounts in a counter-clockwise direction as a result of the torque generated thereby. The engine is mounted by means of the flexible shocks 32, comprising a portion of the mounting brackets 30 which permit the engine to rotate to a degree depending upon the torque generated. The torque measuring apparatus is mounted to the rear portion 5 of the engine by means of bolts 35 or the like with its axis aligned with the engine axis. Since the torque measuring apparatus cannot rotate at the end 18 mounted against the stationary support, and since the end 20 must follow the rotation of the engine, the torsion bar will be twisted to the extent of the rotation of the engine, which is an indication of the delivered torque $\tau$. To prevent damage to the torsion bar as a result of engine shock and vibration and preclude interference with the operation of the engine, the torsion bar is provided with a couple 7 allowing the bar to contract and expand in a lengthwise direction should the engine move along its central axis during operation. In FIGURE 1, the couple 7 comprises a convoluted or bellowed portion of a hollow torsion bar, although other couples may be used as described hereinafter. The couple permits freedom of lengthwise contraction and expansion, but is like the rest of the torsion bar insofar as torsion or twisting moments.

Suitable means generally designated at 22 in FIGURE 1 are mounted on the torsion bar to measure the torque exerted on the bar as the engine rotates on its mounts. Any suitable means can be used to measure the torque or twist on the bar, although a preferred means comprises a plurality of strain gages mounted on the bar in an electrical bridge, with bias connections and output leads being designated at 24 and 26, respectively. The electrical output at 26 is a measure of the torque exerted on the bar, and this signal, when coupled to suitable circuitry, can be used to cause automatic feathering of the propeller 4 if the engine fails on take-off and a loss of torque measured by the torque apparatus is experienced. Moreover, the output signal can be coupled to suitable meters and circuitry to give a measure of certain characteristics of the engine performance during operation that are useful to the pilot, as will be explained hereinafter.

The one or more engines of the aircraft will be delivering an amount of torque during take-off normally near maximum, a result of which the engines will be rotated a proportionate degree on the engine mounts. If an engine fails during take-off such that there is a loss of torque, the engine will rotate back to a degree depending upon the loss of torque, and this rotation produces, by means of the strain gage bridge, an electrical signal that actuates a feathering pump or the like to feather the propeller.

There is shown in FIGURE 3a a side elevational view of the torque apparatus in its perferred embodiment. A sectional view taken along lines b—b of FIGURE 3a is shown in FIGURE 3b, and the apparatus of FIGURE 3a is shown in FIGURE 3c when rotated 180°. For sake of simplicity, the convoluted or bellowed portion of the apparatus is omitted, and only that portion showing the torque measuring means 22 is shown. The apparatus comprises an elongated, resilient metal shaft 14 having an end plate 40 integral therewith to provide means for mounting the shaft to the rear of the engine. A similar end plate (not shown) is provided at the other end of the shaft for being mounted to the stationary support.

In the preferred embodiment the apparatus includes four strain gages, preferably of the semiconductor type, and designated at 52, 54, 56 and 58. The semiconductor strain gage comprises a single crystal of semiconductor material such as silicon, for example, doped to an optimum impurity level. Each of the gages is mounted along a helix of the shaft at an angle of 45° to the shaft axis. Two of the gages 52 and 54 are shown in the side elevational view of FIGURE 3a and are mounted at 90° to each other. The other two gages 56 and 58 are shown mounted at 90° to each other in the revolved view of the shaft shown in FIGURE 3c. Gages 52 and 54 are electrically connected in series as shown, and gages 56 and 58 are similarly connected in electrical series. Each of the two pairs of gages form one side of a bridge circuit with gages 54 and 56 being electrically connected through wire 43, wherein one side of a bias supply schematically denoted at 24 is applied to this interconnection. Similarly, gages 52 and 58 are electrically connected through wire 45, wherein the other side of the bias supply is applied to this interconnection. Each of the gages is a resistor, the resistance of which varies as a function of strain thereon, and the electrical schematic of the gage bridge is clearly shown in FIGURE 4. Output connections are made at the interconnection of gages 52 and 54 and at the interconnection of gages 56 and 58 as denoted by terminals 53 and 55, respectively, in FIGURE 4. The sectional view of FIGURE 3b taken along lines b—b of the side views shows the mountings of the gages.

Figure 4:
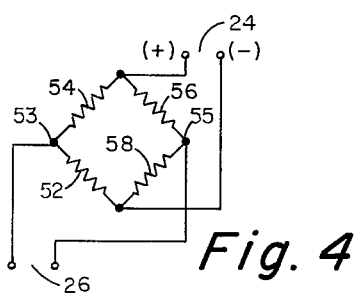
FIGURE 4 is an electrical schematic diagram of the means mounted on the apparatus of FIGURE 3 for measuring the torque.

Each gage is mounted on a 45° helix to take advantage of the maximum tensile and compressive strains to which the shaft will be subjected under torsion. By mounting the adjacent gages 90° to each other, one will be subjected to a compressive strain equal to the tensile strain experienced by the adjacent gage when torque is applied to the bar. When these oppositely strained gages are connected as adjacent legs in a Wheatstone-bridge circuit as shown in FIGURE 4, there will be automatic compensation of all thermally caused resistance changes, in addition to cancellation of any effects due to axial strains. Moreover, by mounting the additional two gages 56 and 58 to the shaft where gage 58 is subjected to the same type of strain as is gage 54, and gage 56 is subjected to the same type of strain as is gage 52, the output at terminals 53 and 55 will be doubled. Further, by mounting gages 56 and 58 diametrically opposite on the shaft to gages 52 and 54, respectively, all effects due to bending of the shaft will be cancelled. Thus, all strain effects except torsional effects are cancelled out. The output at terminals 53 and 55 will be a voltage or current proportional to the degree of unbalance of the bridge which is caused by twisting of the shaft.

Figure 5:
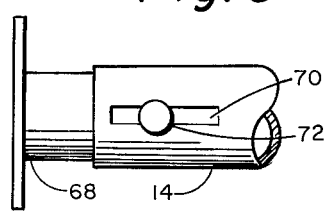
FIGURE 5 is a side elevational view illustrating an alternate construction of the torque bar of FIGURE 1.

A partial view of the shaft 14 is shown in FIGURE 5 and illustrates another embodiment of a couple for permitting freedom of movement along the shaft axis as an alternative to the convolution section 7 shown in FIGURE 1. A key or pin 72 attached to a smaller tubing 68 slides in a slot 70 provided in a longer shaft 14. Thus, any force causing a tendency to expand or contract the tube 14 along its axis will be accompanied by a relative movement of the smaller shaft 68 within the large shaft 14, although the key or pin 72 prevents any relative rotational movement between the two shafts.

Figure 3:
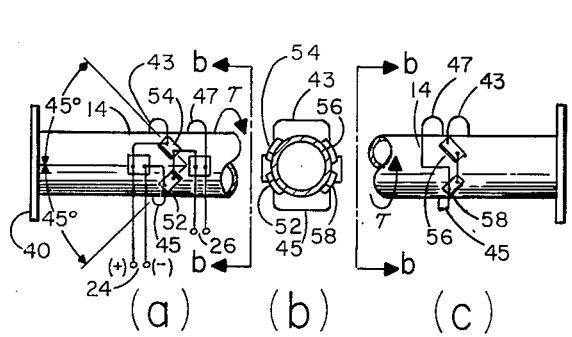
Figure 6:
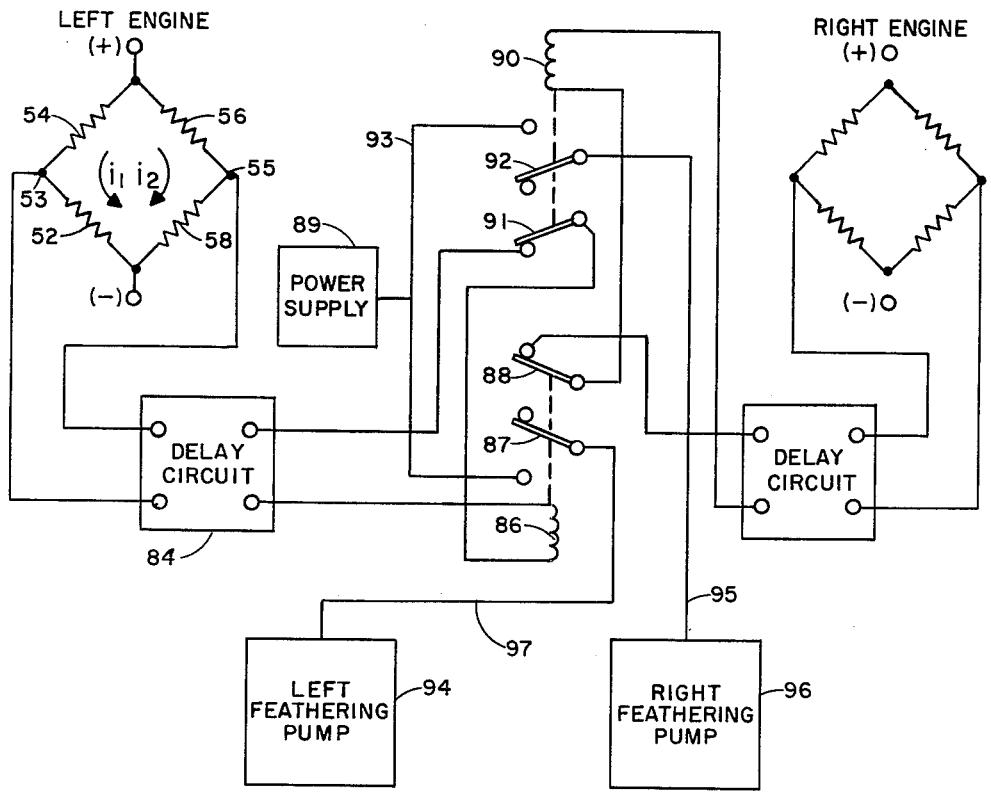
FIGURE 6 is an electrical schematic of an automatic feathering system for a twin-engine aircraft using the present invention.

The invention has several applications, such as, for example, in its use in conjunction with an automatic feathering system, wherein an electrical schematic of a circuit for feathering either of the propellers of a twin engine aircraft is shown in FIGURE 6. The two gages 52 and 54, mounted opposite to each other and each at 45° to the shaft axis as shown in FIGURE 3, are connected in electrical series in one side of a bridge as shown, and gages 56 and 58 are similarly connected in series in the other side of the bridge. A D.C. bias source indicated by the + and − polarities is connected between the interconnections of gages 54 and 56 and the interconnection of gages 52 and 58, and under balanced conditions, equal currents $i_1$ and $i_2$ flow in the two sides of the bridge. Since the feathering circuit is to be operative during take-off of the aircraft only when an engine failure is detected by the torsion measuring apparatus, different unbalance conditions can be used to cause feathering of the propeller, as follows: One method is to install the torsion measuring apparatus so that the bridge is balanced during the generation of the maximum amount of torque exerted by the engine during take-off. A balanced condition is met with the total resistance in one arm of the bridge being equal to the total resistance in the other arm. The gages are initially mounted on the torsion bar with the latter held under torque in a suitable jig to simulate maximum engine torque during take-off, so that the bridge will be balanced in actual operation. Any loss of torque due to engine failure would then produce an unbalanced condition and cause different currents to flow in the two sides of the bridge with a resulting potential difference between points 53 and 55 of the bridge. Alternately, the bridge can be mounted to be initially unbalanced in one direction during maximum delivered torque, such that a loss of torque will cause the bridge to attain balance or become unbalanced in the other direction to provide the output signal. Other alternatives will undoubtedly occur to those skilled in the art which are suitable for this purpose, but for sake of simplicity, the automatic feathering system will be described hereinafter in conjunction with the first technique described, viz. a balanced bridge during maximum delivered torque.

Assume, for purposes of explanation, that the bridge is balanced during maximum torque exerted on take-off and that a reduction in the torque exerted on the shaft creates an unbalanced condition in the bridge. The output at terminals 53 and 55 of the bridge is coupled to a delay circuit 84, the output of the delay circuit of which is connected in series with a relay winding 86. Current through the relay winding 86 actuates a double-pole switch 87–88 which, in turn, completes an electrical circuit to the feathering pump of the particular propeller to be feathered. A similar actuating circuit including a torsion measuring apparatus is provided for the other engine, as shown in the figure. Since it would be undesirable to feather a propeller when the engine "coughs" and almost immediately thereafter regains its power, the delay means are provided in the actuating circuits to insure that an engine failure had actually occurred and that a loss of torque has been sustained for a predetermined period of time before feathering occurs. Normally, this is from one to one and a half seconds. If the engine sustains a loss of torque for this length of time, it is usually desirable to feather the engine. It is further undesirable that both propellers be feathered, since this would result in a complete loss of take-off power. Thus, if one engine fails, it is feathered, and even if the second engine fails or partially fails, the propeller of that engine is not feathered in order to derive whatever take-off power that may be provided by that engine. The delay circuit used here can be of any conventional design to insure that the relay 86, for example, is not actuated until the bridge has been in an unbalanced condition for a minimum prescribed time. Thus, the delay circuit can take the form of an input gate which is opened immediately upon any signal from the bridge representing a condition of unbalance, and closed when the unbalanced condition is removed. The gate, when open, completes a charging circuit of an R-C network, for example, through a constant charging voltage. When the capacitor has attained a certain prescribed percentage of the charging voltage, which is a function of time, a switch is closed to complete the circuit through the relay 86, thus actuating the feathering pump. Should the bridge again attain a balanced condition prior to the time delay circuit capacitor reaches its prescribed voltage, the gate will be closed and the capacitor rapidly discharged, thus preventing feathering action. Many other conventional delay circuits are suitable for this purpose, whereas the above description is for purposes of example only.

The output of the left-engine delay circuit 84 is connected in series with a relay 86 through one contact 91 of another relay 90. The contact 91 is shown in the unactuated position, such that the circuit through the relay 86 is completed when relay 90 is not actuated. Similarly, the output of the delay circuit from the right engine is connected in series with relay 90 through contact 88 of relay 86, such that the circuit through the relay 90 is completed when the relay 86 is not actuated. The feathering pump 94 for feathering the propeller of the left engine and which can be of any type known in the aircraft industry has its input 97 connected to one side of a second contact 87 of relay 86, a power supply 89 for energizing the feathering pump having its output 93 connected to the other side of contact 87. When relay 86 is not actuated, there is not a complete circuit between the power supply and the feathering pump. A right feathering pump 96 is similarly connected to one side of second contact 92 of the relay 90, and the power supply also has its output connected to the other side of this contact. It will also be seen that a complete circuit is not provided between the power supply and the right feathering pump when relay 90 is not actuated.

Assume, for example, that the left engine fails during take-off and a loss of torque is sustained for a period of time sufficient to provide an output at the delay circuit. Relay 86 is then actuated and contacts 87 and 88 are closed to their lower position. This connects the power supply 89 to the left feathering pump 94 and the propeller is then feathered in a conventional manner. When the relay 86 is actuated and contact 88 is brought to its lower position, the relay circuit output through relay 90 is open, and even though the right engine sustains a power failure for a sufficient time to create a delay circuit output, the right propeller cannot be feathered, since there is not a complete current path through relay 90. Similarly, in the event the right engine fails prior to failure of the left engine, the right engine propeller would be feathered and automatic feathering of the left engine would be impossible. Thus, this circuit satisfies the requirement of permitting only one engine propeller to be feathered.

Figure 7:
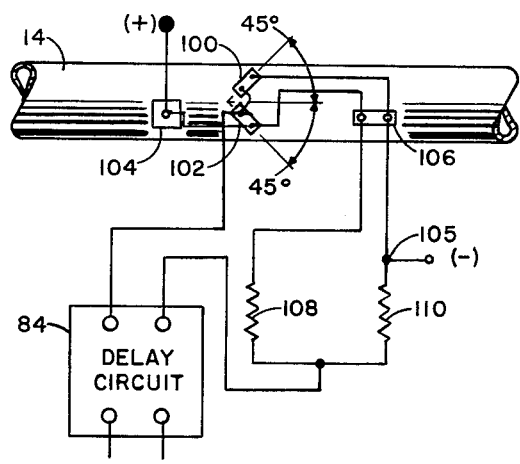
FIGURE 7 is another embodiment of the torque responsive apparatus of the invention.
Figure 8:
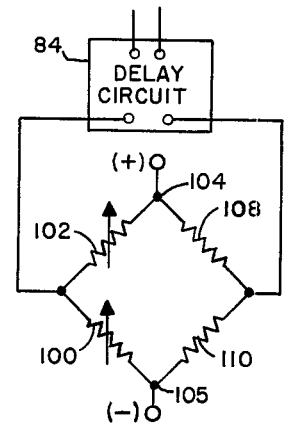
FIGURE 8 is an electrical schematic of the torque measuring means mounted on the apparatus of FIGURE 7.

A simplified embodiment of the torque apparatus of this invention is shown in FIGURE 7, wherein only two strain gages 100 and 102 are mounted along 45° helices on the torsion bar. Although only a single gage could be used to give an electrical signal output, two are required for automatic temperature compensation, as noted above. Again, each gage is mounted at 45° to the shaft axis and are mounted at 90° to each other, and compressive strain on one gage is tensional strain on the other. The gages are connected in a bridge circuit as described previously, but with fixed resistors 108 and 110 through terminal 106. A bias source is connected between the interconnection of gage 102 and fixed resistor 108 and the interconnection of gage 100 and fixed resistor 110 via terminals 104 and 105, respectively. An output from the bridge circuit is taken between the interconnections of the two transducers and the interconnection of the fixed resistors and coupled to a delay circuit 84. An electrical schematic of the bridge circuit, as connected to the delay circuit is shown in FIGURE 8, wherein the two gages comprise one arm of the bridge, and the two fixed resistors form the other arm of the bridge, with bias connections as shown. The torsion apparatus described here is adequate to provide a signal proportional to the torque on the engine, although the output of the bridge is only one-half as great as the output derived from a bridge circuit containing four gages.

Figure 9:
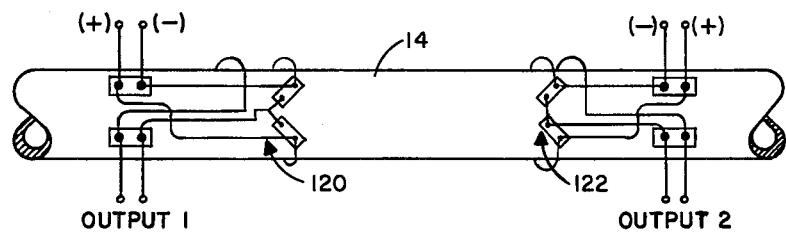
FIGURE 9 is another embodiment of the apparatus illustrating a fail-safe system to prevent erroneous engine failure indications.
Figure 10:
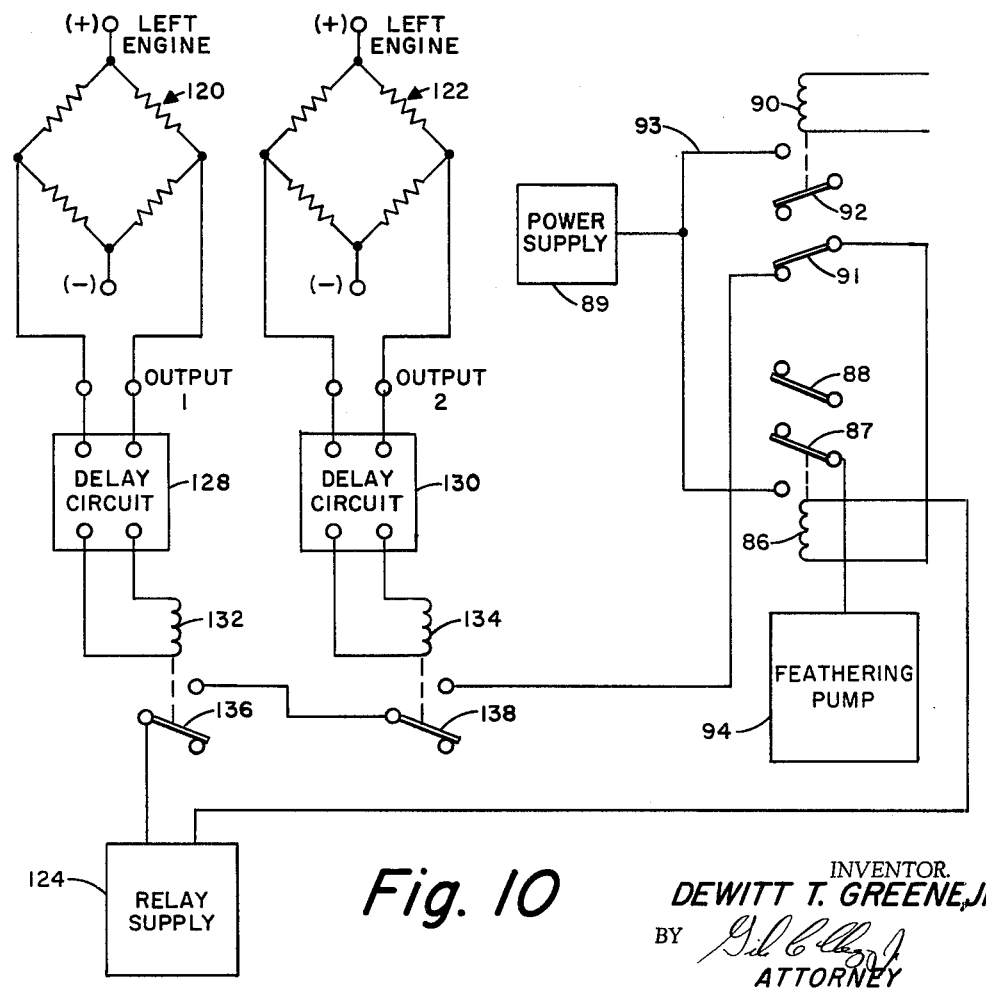
FIGURE 10 is an electrical schematic of an automatic feathering system using the fail-safe apparatus shown in FIGURE 9.

To further insure proper indication of engine failure, it is desirable that the automatic feathering system with which this invention is used be made fail-safe to prevent an erroneous automatic feathering of an engine. Thus, if one of the strain gages sustains a break or is damaged, or an electrical connection is broken by vibration or the like, such that the bridge would be unbalanced, feathering of that engine could occur. The system would then erroneously indicate engine failure when this would not be the actual case. To increase the reliability of the system, there is shown in FIGURE 9 a torsion apparatus including two bridge circuits, each of which comprises four strain gages. One bridge generally designated at 120 comprises four strain gages with output 1, and the other bridge designated generally at 122 has output 2, the two bridges being mounted relatively close together on the torsion bar 14. Referring to FIGURE 10, there is shown an electrical schematic for utilizing the two bridges so that unbalance of both bridges must occur before automatic feathering will take place. In the schematic, the output from bridge 120 is connected to a delay circuit 128, the output of delay circuit of which is connected to a relay 132. Similarly, the output from the bridge 122 is connected to a delay circuit 130, the output of the delay circuit being connected to a relay 134. The contacts 136 and 138 of the relays 132 and 134, respectively, are open in the unactuated condition, as shown. These contacts, when both are closed upon actuation of both relays 132 and 134, complete a circuit for supplying power from relay supply 124 through relay 86 and contact 91 of relay 90. Relay 86 is the same relay as described with reference to FIGURE 6, and when actuated, completes an electrical circuit between the power supply 89 and the feathering pump 94. It will also be noted that the circuit between the power supply and feathering pump can only be completed when relay 90 is not actuated. The other engine circuitry is not shown but is similar to that of the figure. It will be seen, then, that both relays 132 and 134 must be actuated to close their respective contacts 136 and 138 before relay 86 is actuated. Thus, if one of the bridge circuits gives an erroneous indication of engine failure and the other bridge circuit does not, the engine propeller cannot be automatically feathered.

The torque measuring apparatus of this invention is also useful for providing the pilot with an indication of engine performance characteristics. There are at least two indications of engine performance that are of interest to the pilot which can be measured by this system. One is the brake horsepower which is the amount of horsepower delivered by the engine to the propeller and hereinafter referred to as BHP. It is well known that BHP is related to the r.p.m. and torque generated by the engine by the expression (1) $\qquad BHP = k_1 r.p.m. \tau$ where $k_1$ is a constant of proportionality of the engine r.p.m. is the revolutions per minute of the engine, and $\tau$ is the torque generated by the engine. Another indication of engine performance which is of interest to the pilot is the brake mean effective pressure, hereinafter referred to as BMEP, which is the amount of pressure in force per unit area generated by the engine to create the torque. It is well known that BMEP is related to torque by the expression (2) $\qquad BMEP = k_2 \tau$ where $k_2$ is another constant of proportionality of the engine. From these two equations, it can be seen that BHP is a function of both the r.p.m. and the torque and is related to the product of these two terms, whereas BMEP is a function only of the torque generated by the engine.

Figure 11:
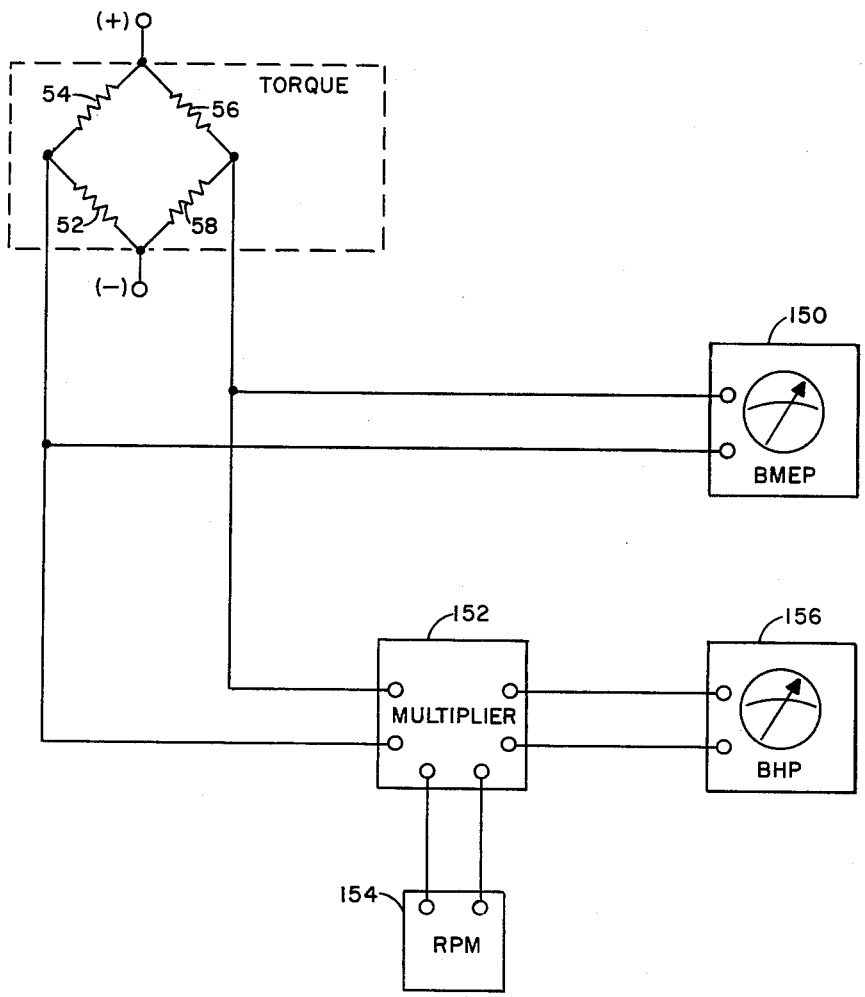
FIGURE 11 is an electrical schematic of a system for indicating engine performance characteristics using the present invention.

An electrical schematic of a circuit for measuring these two quantities with the torque measuring apparatus of this invention is shown in FIGURE 11, wherein reference is had to the bridge comprised of the transducers 52, 54, 56 and 58 as previously described, which yields an indication of the torque generated as designated by the dashed enclosure. In this instance the strain gages are initially mounted on the torsion bar in a balanced condition with no torque applied, so that the torque applied to the bar will be indicated by a bridge output voltage proportional thereto. The output of the bridge is connected directly to a milliameter 150 labeled BMEP, and this meter is calibrated in terms of the BMEP generated by the engine according to the constant of proportionality $k_2$. To arrive at a BHP measurement, a conventional r.p.m. indicator 154 is electrically coupled to a conventional multiplier 152, wherein the multiplier input is also connected to the bridge output. The multiplier 152 multiplies the electrical signal from the bridge by the electrical signal from the r.p.m. indicator to produce at its output an electrical current or signal proportional to the product of the r.p.m. and torque. The output of the multiplier is connected to a milliameter 156 labeled BHP for indicating the BHP reading, where the meter 156 is calibrated according to constant $k_1$ of Equation 1. For D.C. bias applied across the bridge as shown, it is necessary that the r.p.m. device output also be a D.C. voltage. Conventionally, however, aircraft are provided with a tachometer or generator having an alternating current output proportional to the r.p.m. generated, and it is necessary that the A.C. current output be filtered to provide a D.C. input to the multiplier. Alternately, an A.C. bias source can be provided across the bridge. The multiplier as shown in the figure can be of any suitable type well known in the electronic art.

Many other embodiments, modifications and applications of the present invention that do not depart from the true scope thereof will become apparent to those skilled in the art, and it is intended that the invention be limited only as defined in the appended claims.

What is claimed is:

1. Apparatus for measuring the torque delivered by an engine flexibly supported on mounts for rotation from its rest position to an angle determined by the torque delivered thereby, comprising:
    (a) a torsion bar adapted for being rigidly secured at one end to said engine and at the other end to a stationary support for being twisted along its length as said one end rotates with said engine on said mounts in response to said delivered torque,
    (b) said torsion bar comprising a cylindrical shaft, the axis of which is aligned with the axis of rotation of said engine on said mounts, which includes a section adapted for freedom of expansion and contraction along the axis thereof, and
    (c) pressure responsive means attached to said torsion bar and being strained proportional to the amount said torsion bar is twisted.

2. Apparatus according to claim 1 wherein said section of said torsion bar comprises a convoluted portion of said shaft.

3. Apparatus for measuring the torque delivered by an engine flexibly supported on mounts for rotation from its rest position through an angle determined by the torque delivered thereby, comprising:
    (a) a cylindrical shaft adapted for being secured at one end to said engine and at the other end to a stationary support for being twisted along its length as said one end rotates with said engine on said mounts in response to said delivered torque,
    (b) said shaft including a convoluted section to permit freedom of expansion and contraction along the axis thereof,
    (c) a first pair of strain gages attached to said shaft diametrically opposite each other along a first helix thereof at an angle of 45° to said shaft axis,
    (d) a second pair of strain gages attached to said shaft diametrically opposite each other along a second helix thereof at an angle of 45° to said shaft axis and at an angle of 90° to said first helix, and
    (e) said first and said second pair of gages being interconnected in an impedance bridge circuit with said first pair of gages forming opposite legs thereof and said second pair of gages forming opposite legs thereof.

4. Apparatus for measuring the torque delivered by an engine flexibly supported on mounts for rotation from its rest position through an angle determined by the torque delivered thereby, comprising:
    (a) a torsion bar adapted for being rigidly secured at one end to said engine and at the other end to a stationary support in aligned relationship with said axis of rotation of said engine on said mounts for being twisted along its length as said one end rotates with said engine on said mounts in response to said delivered torque,
    (b) said torsion bar being adapted for freedom of expansion and contraction along the axis thereof, and (c) means attached to said torsion bar for measuring the amount by which said torsion bar is twisted.

References Cited by the Examiner

UNITED STATES PATENTS

| | | | |
|---|---|---|---|
| 1,323,103 | 11/1919 | Roe | 244—54.5 |
| 2,354,923 | 8/1944 | McNamee | 73—59 |
| 2,385,005 | 9/1945 | Langer | 73—136 |
| 2,428,012 | 9/1947 | Collins et al. | 73—136 |
| 2,443,438 | 6/1948 | Wilson | 170—135.29 X |
| 2,511,178 | 6/1950 | Roters | 73—136 |
| 2,605,849 | 8/1952 | Bordelon | 170—135.29 |
| 2,909,764 | 10/1959 | Chambers | 73—136 X |
| 2,939,317 | 6/1960 | Mason | 73—134 |
| 2,943,480 | 7/1960 | Nelting | 73—88.5 |

FOREIGN PATENTS 500,247   2/1939   Great Britain.

RICHARD C. QUEISSER, *Primary Examiner.*

J. E. WEST, *Examiner.*

W. E. BURNS, CHARLES A. RUEHL,
*Assistant Examiners.*